United States Patent [19]

Speicher

[11] 4,215,906
[45] Aug. 5, 1980

[54] ZERO SLIP FOUR-POINT CONTACT THRUST BEARING

[75] Inventor: John M. Speicher, Pomona, Calif.

[73] Assignee: General Dynamics Corporation, Pomona, Calif.

[21] Appl. No.: 58,879

[22] Filed: Jul. 19, 1979

[51] Int. Cl.³ .............................................. F16C 33/58
[52] U.S. Cl. ..................................... 308/235; 308/219
[58] Field of Search ............... 308/235, 219, 230, 233, 308/174, 188, 189 R

[56] References Cited

U.S. PATENT DOCUMENTS

| | | | |
|---|---|---|---|
| 596,678 | 1/1898 | Heath | 308/195 |
| 718,376 | 1/1903 | O'Reilly | 308/189 |
| 2,467,870 | 4/1949 | Stephenson | 308/174 |
| 2,609,674 | 9/1952 | Groat | 308/189 |
| 2,723,169 | 11/1955 | Petit | 308/195 |

*Primary Examiner*—Lenard A. Footland
*Attorney, Agent, or Firm*—Neil F. Martin; Edward B. Johnson

[57] ABSTRACT

Disclosed is a thrust bearing which includes a first member having a circular raceway disposed thereon, a second member having a circular raceway spaced apart from and aligned with the raceway of the first member, and a plurality of balls in the circular raceways and separating the two members. Each of the balls make contact at two points on the circular raceway of the first member and they also make contact at two other points on the circular raceway of the second member. The cross-sectional demensions of both the circular raceways and the balls are interrelated by an equation which insures that zero slippage occurs at the contact points between the surface of the balls and the surface of the raceways.

8 Claims, 5 Drawing Figures

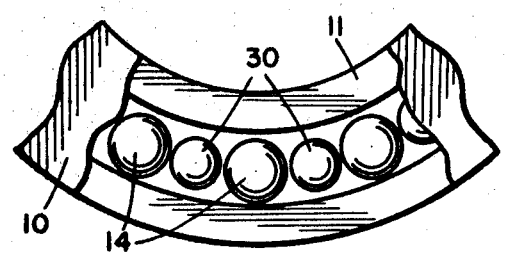

Fig. 4

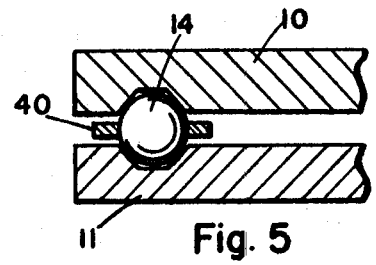

Fig. 5

TABLE I.

EQ. 1 $\quad V_{P14} = W_{14}\, r\, \cos\theta_1$

EQ. 2 $\quad V_{Q14} = W_{14}\, r\, \cos\theta_2$

EQ. 3 $\quad V_{P13} = W_{11}\, R$

EQ. 4 $\quad V_{Q13} = W_{11}(R + r\sin\theta_1 + r\sin\theta_2)$

EQ. 5A $\quad V_{P14} = V_{P13}$

EQ. 5B $\quad V_{Q14} = V_{Q13}$

EQ. 6 $\quad W_{14}\, r\, \cos\theta_1 = W_{11}\, R$

EQ. 7 $\quad W_{11} = \dfrac{W_{14}\, r\, \cos\theta_1}{R}$

EQ. 8 $\quad W_{14}\, r\, \cos\theta_2 = W_{11}(R + r\sin\theta_1 + r\sin\theta_2)$ EQ. 9 $\quad W_{14}\, r\, \cos\theta_2 = \dfrac{W_{14}\, r\, \cos\theta_1}{R}(R + r\sin\theta_1 + r\sin\theta_2)$ EQ. 10 $\quad 0 = \cos\theta_1\left(1 + \dfrac{r}{R}\sin\theta_1 + \dfrac{r}{R}\sin\theta_2\right) - \cos\theta_2$ EQ. 11 $\quad \dfrac{r}{R} = 0.1,\ \theta_1 = 45°$ EQ. 12 $\quad \theta_2 = 36.3°$

ZERO SLIP FOUR-POINT CONTACT THRUST BEARING

BACKGROUND OF THE INVENTION

This invention relates to bearings, and more particularly to a class of bearings called thrust bearings. Basically, thrust bearings are characterized in that they separate two flat surfaces that are being pressed together to thereby allow those surfaces to be moved parallel to each other. One thrust bearing for example is described in U.S. Pat. No. 2,609,674 issued Sept. 7, 1952. Thrust bearings are to be distinguished from other types of bearings, such as shaft support bearings. An exemplary shaft support bearing is described in U.S. Pat. No. 718,376 issued Jan. 13, 1903. Basically, shaft support bearings extend around the circumference of a shaft to allow it to rotate while being held in a particular axial alignment.

In the prior art, thrust bearings were either of the two-point contact type, or of the four-point contact type. The former have only one contact point with each of the two flat surfaces that they separate; whereas the latter have two contact points with each of the surfaces that they separate. Four-point contact bearings are preferred because they can withstand greater compressing forces between the flat surfaces. By definition, average stress at a contact point in a thrust bearing equals the compressing force between the flat surfaces divided by the contact area. And in general, the contact area in a four-point contact thrust bearing is larger than that of two-point contact thrust bearing.

However, inspite of their ability to withstand high compressing forces, four-point contact thrust bearings have in the past received substantially less use than two-point contact thrust bearings. A primary reason for this is that prior art four-point contact thrust bearings would wear due to slippage that occurred at the contact points between the balls and the raceways of the bearing. By comparison, two-point contact thrust bearing simply do not have this problem.

Therefore, the primary object of the present invention is to provide a four-point contact thrust bearing which also has zero slippage between its balls and raceway.

SUMMARY OF THE INVENTION

These and other objects are accomplished by a thrust bearing comprised of a first member having a circular raceway disposed thereon and a second member having a circular raceway spaced apart from and aligned with the raceway of the first member. A plurality of balls lie in the circular raceways, and each of the balls makes contact at two points on the circular raceway of said first member and also make contact at two other points on the circular raceway of said second member. In order that no slippage occurs at the contact points, the cross-sectional dimensions of both of said circular raceways and the balls are interrelated as defined by the equation $$0 = \cos\theta_1 (1 + \frac{r}{R} \sin\theta_1 + \frac{r}{R} \sin\theta_2) - \cos\theta_2.$$

In this equation, R is the distance from the center of the circular raceways to the contact point nearest that center; r is the radius of the balls; $\theta_1$ is the angle between a first hypothetical line perpendicular to the circular raceways and second hypothetical line through the center of the balls and through the contact point nearest the center of the circular raceways; and $\theta_2$ is the angle between the first hypothetical line and a third hypothetical line through the center of the balls and through the contact point furthest from the center of the circular raceways.

BRIEF DESCRIPTION OF THE DRAWINGS

Various preferred embodiments of the invention will best be understood by reference to the following detailed description and accompanying drawings wherein.

Table 1 is a set of equations wherein the conditions for zero slippage to occur are derived.

FIG. 4 is a plane view of a portion of a second embodiment of the invention.

FIG. 5 is a cross-sectional view of a portion of still another embodiment of the invention.

DETAILED DESCRIPTION

Figure 1:
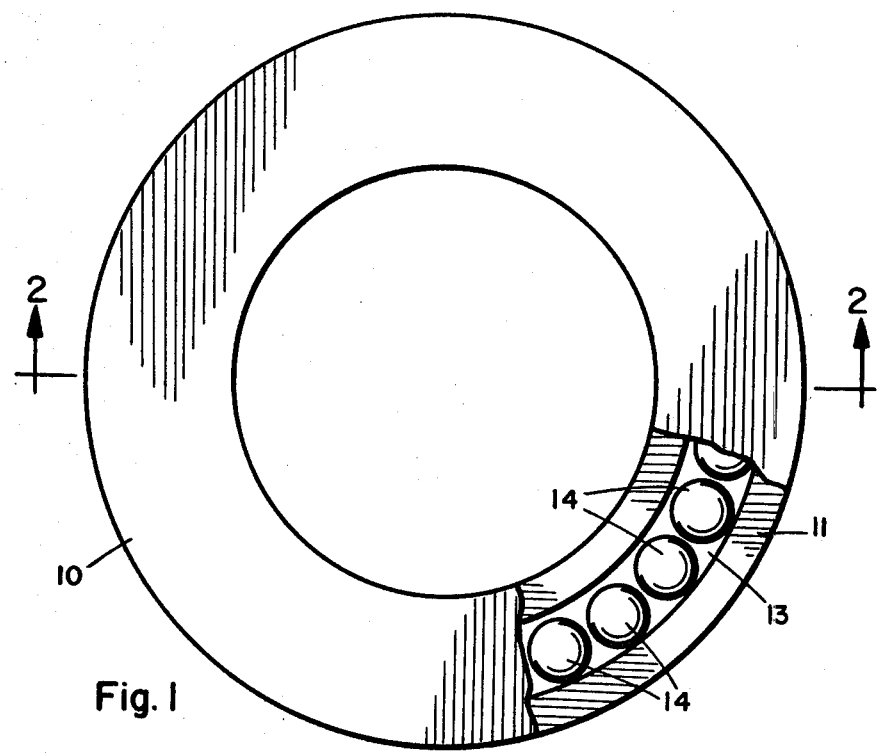
FIG. 1 is a plane view of a thrust bearing constructed according to the invention.
Figure 2:
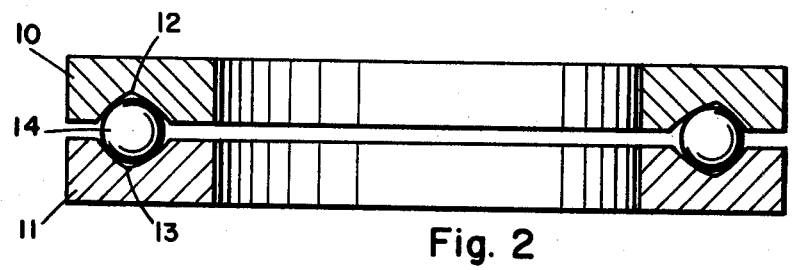
FIG. 2 is a cross-sectional view of the FIG. 1 embodiment.

A preferred embodiment of a thrust bearing that is constructed according to the invention will now be described in conjunction with FIGS. 1 and 2. As those figures illustrate, the thrust bearing is comprised of a pair of rigid members 10 and 11 which are spaced apart from one another. A variety of materials, such as steel or plastic for example may be used to construct these members.

Included within member 10 is a circular raceway 12; and included within member 11 is a similar raceway 13. The raceways 12 and 13 are spaced apart from and aligned with one another. These raceways are illustrated as being formed by a groove in their respective members. Alternatively, they can be formed as physically separable portions of those members.

A plurality of balls 14, which basically function to keep members 10 and 11 separate, lie within raceways 12 and 13. These balls may also be constructed of a wide variety of materials, such as steel or plastic for example. The balls 14 are disposed essentially side by side all the way around the circular raceways. Each of the balls makes contact at points P and Q of raceway 12, and also makes contact at points P and Q of raceway 13.

Figure 3:
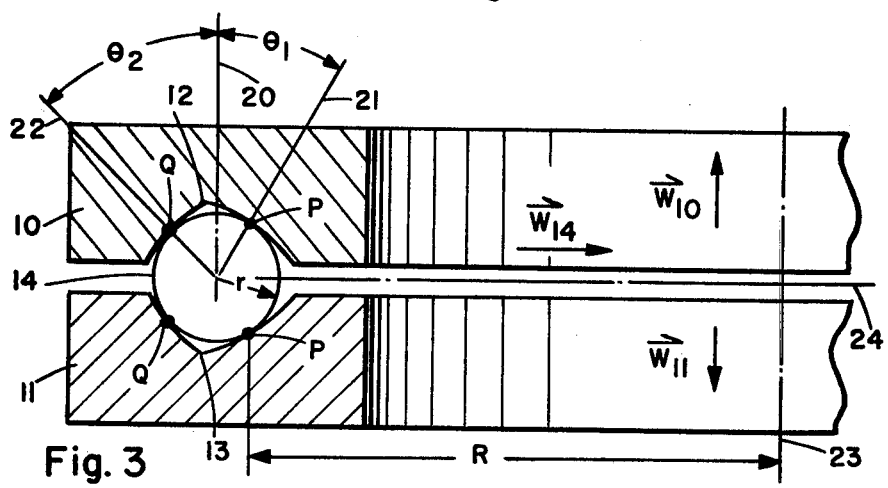
FIG. 3 is an enlarged view of a portion of the FIG. 2 cross-section.

FIG. 3 illustrates the cross-section of the raceways and the position of the contact points P and Q in greater detail. The position of these contact points is critical in that they determine whether or not any slippage occurs between the outer surface of the balls 14 and the raceways 12 and 13. It is of course, desirable to reduce this slippage to zero and thereby minimize both wear and friction between the balls 14 and the raceways 12 and 13. To that end, the raceways and the balls are constructed to be interrelated as defined by the following equation A:

$$0 = \cos\theta_1 (1 + \frac{r}{R} \sin\theta_1 + \frac{r}{R} \sin\theta_2) - \cos\theta_2 \quad \text{EQUATION A}$$

In equation A, R is the distance from the center of the circular raceways 12 and 13 to the contact points P; r is the radius of the balls 14; $\theta_1$ is the angle between a hypothetical line 20 which lies perpendicular to the plane of the raceways 12 and 13 and a second hypothetical line 21 which passes through the center of the balls 14 and through the contact point P; and $\theta_2$ is the angle between line 20 and another hypothetical line 22 which passes through the center of balls 14 and through contact point Q.

A mathematical proof of why zero slip occurs when the conditions of equation A are satisfied is presented in Table 1. With reference to FIG. 2, assume that member 10 is rotating about axis 23 in the direction indicated by the vector $\vec{W}_{10}$ (using the standard right hand rule). Assume that member 11 is rotating about axis 23 in the opposite direction of $\vec{W}_{10}$ and at the same speed as member 10. Assume further that member 14 is rotating about axis 24 at a speed of $W_{14}$ in the direction shown by vector $\vec{W}_{14}$. Consider first equations 1 through 4 of Table 1. Equation 1 gives an expression for the velocity $V_{p14}$ which is the velocity of point P on ball 14. That velocity is a function of the angular rotation $W_{14}$ of the ball, the radius r, and the cosine of angle $\theta_1$. $V_{p14}$ is directed out of the paper in FIG. 3. Similarly, equation 2 gives an expression for $V_{Q14}$ which is the velocity of point Q on ball 14. $V_{Q14}$ is also directed out of the paper.

By comparison, equation 3 is an expression for the velocity $V_{p13}$ which is the velocity of point Q on raceway 13. These velocities are a function of the angular rotation $W_{11}$ of member 11 and the distance from the center of the circular raceway 13 to the points P and Q. Similar expressions could of course be written for the velocity of point P' and Q' on raceway 12.

In order for there to be zero slip between ball 14 and raceway 13, the velocity of points P and Q on the ball must equal the velocity of points P and Q on the raceway. This is expressed mathematically by equations 5a and 5b. Substitution of equations 1 and 3 into equation 5a yields equation 6. And equation 6 can be used to express $W_{11}$ in terms of $W_{14}$ as indicated by equation 7.

Similarly, substitution of equations 2 and 4 into equation 5b yields equation 9. And a further substitution of equation 7 into equation 8 yields equation 9. In that equation, the terms $W_{14}$ and r cancel out. And thus, equation 9 can be rewritten in the form of equation 10, which is the same as the previously recited equation A.

There are four variables in equation 10, namely r, R, $\theta_1$, and $\theta_2$. Any three of those variables may be chosen at random while the fourth variable is determined by the choice of the first three. An example is illustrated in equations 11 and 12. There, the values indicated in equation 11 were arbitrarily picked; whereas the value indicated in equation 12 was obtained by substituting the values of equation 11 into equation 10.

Equation 10 may be satisfied by raceways having surfaces which are rounded or by raceways having surfaces which are flat. FIGS. 2 and 3 illustrate the former while FIG. 5 illustrates the latter. Rounded surfaces enable the thrust bearings to support the heaviest loads because they increase the amount of area that makes up the contact points.

Another preferred embodiment of the invention is illustrated in FIG. 4. This embodiment is similar to the embodiment of FIGS. 1 through 3, and like parts are identified by like reference numerals. The only difference is that in the FIG. 4 embodiment, the balls 14 are uniformly spaced apart all the way around the circular raceways and a plurality of spheres 30 lie in the spaces between the balls. These spheres are slightly smaller (e.g. 1%–20%) than the balls and act as spacers for them. Preferably, the spheres are constructed of material having a low coefficient of friction such as plastic.

Still another preferred embodiment of the invention is illustrated in FIG. 5. This embodiment is also similar to the embodiment of FIGS. 1 through 3 and like parts are identified by like reference numerals. In the FIG. 5 embodiment however, the primary difference is that the balls 14 are uniformly spaced apart all the way around the raceways and a plurality of ring shaped members 40 are placed respectively around the balls to substantially fill the spaces. The members 40 are suitably constructed of steel or plastic for example. Their function is simply to keep the balls separated as they rotate in the raceways. A variety of other ball retainers are commonly used by existing ball thrust bearings. Their general purpose is to keep the balls separated or evenly spaced around the races. Any of these existing ball retainers could be used on the invention.

Various preferred embodiments of the invention have now been described in detail. In addition, many changes and modifications can be made to these details without departing from the nature and spirit of the invention. Thus, it is to be understood that the invention is not limited to said details but is defined by the appended claims.

I claim:

1. A zero slip four-point-contact ball thrust bearing comprised of:

a first member having a circular raceway disposed thereon;

a second member having a circular raceway spaced apart from and aligned with said raceway of said first member; and a plurality of balls in said circular raceways, each of said balls making contact at two points on the circular raceway of said first member and also making contact at two other points on the circular raceway of said second member; wherein the cross-sectional dimensions of both of said circular raceways and said balls are interrelated as defined by the equation;

$$0 = \cos\theta_1 \left(1 + \frac{r}{R}\sin\theta_1 + \frac{r}{R}\sin\theta_2\right) - \cos\theta_2$$

where R is the distance from the center of said circular raceways to the contact point nearest that center;

r is the radius of said balls;

$\theta_1$ is the angle between a first hypothetical line perpendicular to said circular raceways, and second hypothetical line through the center of said balls and through the contact point nearest the center of said circular raceways, and $\theta_2$ is the angle between said first hypothetical line and a third hypothetical line through the center of said balls and through the contact point furthest from the center of said circular raceways.

2. A thrust bearing according to claim 1 wherein said raceways consist of grooves in respective surfaces on said first and second members.

3. A thrust bearing according to claim 1 wherein the cross-section of said raceways is V-shaped.

4. A thrust bearing according to claim 1 wherein the surfaces of said raceways are curved to increase the area in contact with said balls at said contact points.

5. A thrust bearing according to claim 1 wherein said balls are disposed essentially side by side all the way around said circular raceways.

6. A thrust bearing according to claim 1 wherein said balls are uniformly spaced apart all the way around said circular raceways; and further including a plurality of spheres which are smaller than said balls and which respectively lie in the spaces between said balls.

7. A thrust bearing according to claim 6 wherein said spheres are 1%–20% smaller than said balls.

8. A thrust bearing according to claim 1 wherein said balls are uniformly spaced apart all the way around said raceway; and further including a plurality of ring shaped members placed respectively around said plurality of balls to substantially fill said spaces therebetween.

* * * * *